Figure 1:
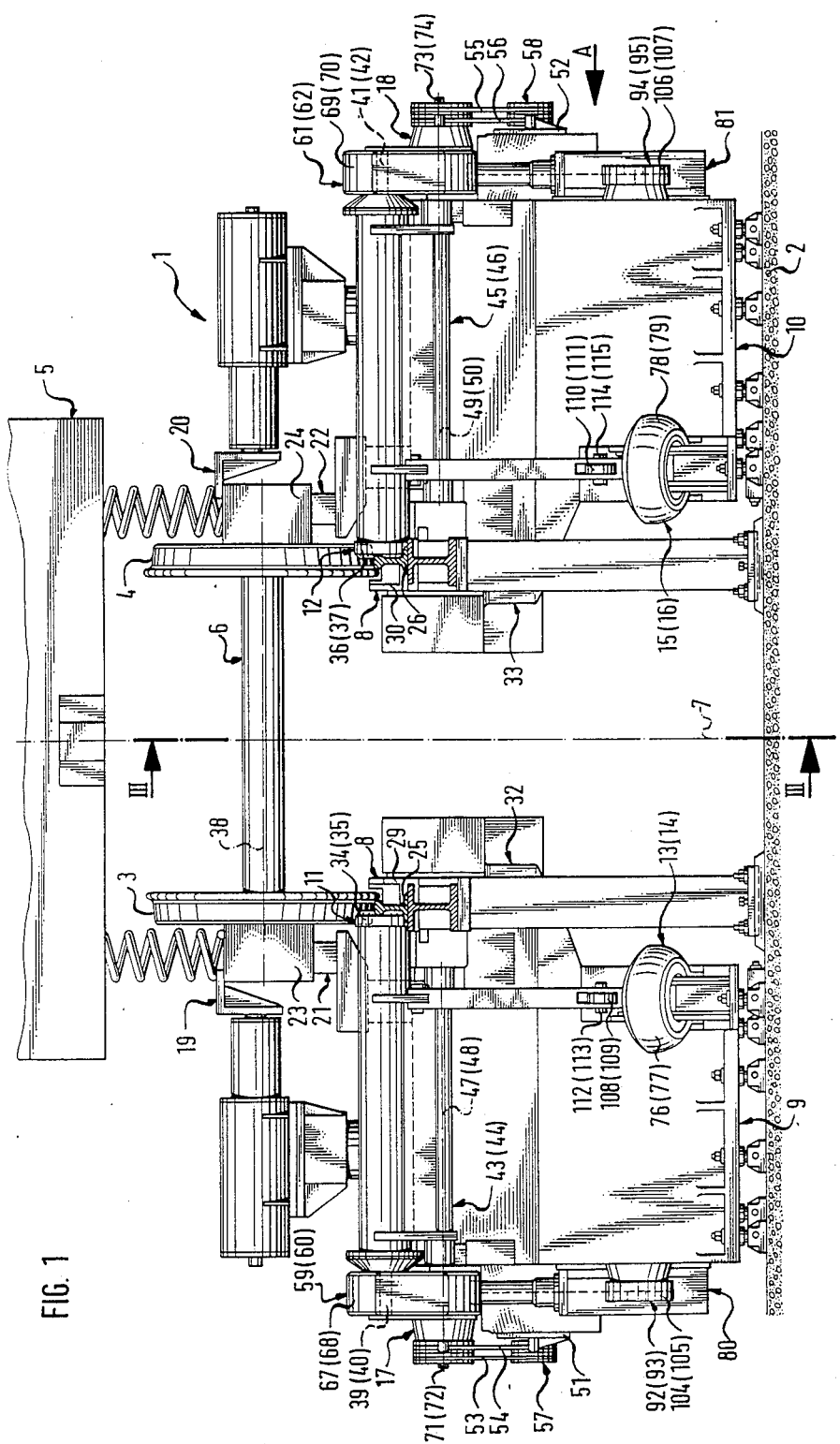

United States Patent [19]

Gutöhrlein et al.

[11] Patent Number: 4,674,370
[45] Date of Patent: Jun. 23, 1987

[54] UNDERFLOOR WHEELSET TURNING MACHINE FOR REPROFILING WHEEL TIRE CONTOURS OF RAILWAY WHEELSETS

[75] Inventors: Uwe Gutöhrlein, Dortmund; Dirk Brinkmann, Lünen-Niederaden, both of Fed. Rep. of Germany

[73] Assignee: Hoesch Maschinenfabrik, Fed. Rep. of Germany

[21] Appl. No.: 844,720

[22] Filed: Mar. 27, 1986

[30] Foreign Application Priority Data

Mar. 27, 1985 [DE] Fed. Rep. of Germany ... 8509180[U]

[51] Int. Cl.$^4$ .............................................. B23B 5/28
[52] U.S. Cl. ...................................................... 82/8
[58] Field of Search ...................... 82/8; 409/165, 166

[56] References Cited

U.S. PATENT DOCUMENTS 3,598,017  8/1971  Saari .......................................... 82/8
4,597,143  7/1986  Dombrowski ...................... 409/165

FOREIGN PATENT DOCUMENTS 2937819  3/1981  Fed. Rep. of Germany ............ 82/8
3012996  10/1981  Fed. Rep. of Germany ............ 82/8
3012997  10/1981  Fed. Rep. of Germany ............ 82/8

Primary Examiner—Nicholas P. Godici
Assistant Examiner—Jerry Kearns

[57] ABSTRACT

An underfloor wheelset turning machine for reprofiling the wheel tire contours of railway wheelsets comprising two driven friction roller pairs each adapted to be pressed against a wheel tire contour of a wheelset, the friction rollers of each friction roller pair being individually connected in each case to a pivot drive and each pivotal about a pivot axis arranged parallel to the wheelset axle, is distinguished for uniform application of the friction rollers and automatic alignment of the wheelset axle in that each pivot drive (13, 14, 15, 16) comprises a pneumatic bellows cylinder (76, 77, 78, 79) for producing the pivot movement and that in each case two pivot drives (13, 14, 15, 16) associated with a friction roller pair (11, 12) are coupled to a synchronizing means (80, 81).

3 Claims, 8 Drawing Figures

UNDERFLOOR WHEELSET TURNING MACHINE FOR REPROFILING WHEEL TIRE CONTOURS OF RAILWAY WHEELSETS

The invention relates to an underfloor wheelset turning machine for reprofiling the wheel tire contours of railway wheelsets comprising two driven friction roller pairs each adapted to be pressed against a wheel tire contour of a wheelset, the friction rollers of each friction roller pair being individually connected in each case to a pivot drive and each pivotal about a pivot axis arranged parallel to the wheelset axle.

In an underfloor wheelset turning machine according to DE-GM No. 8,433,487 the pivot drives are used for pressing the friction rollers onto the wheel tire contours of the wheelset, furthermore for raising and lowering the wheelset and for aligning the wheelset with the machine centre.

It has been found that the pivot drives used in this underfloor wheelset turning machine are not well suited to the uniform application of the friction rollers to the wheel tire contours of the wheelset and for automatic alignment of the wheelset axle with the machine centre.

The invention is based on the problem of further developing the pivot drives of an underfloor wheelset turning machine of the type set forth at the beginning in such a manner that they are very well suited to the uniform application of the friction rollers to the wheel tire contours of the wheelset and to the automatic alignment of the wheelset axle with the machine centre.

According to the invention this problem is solved in that each pivot drive comprises a pneumatic bellows cylinder for producing the pivot movement and that in each case two pivot drives associated with a friction roller pair are coupled to a synchronizing means.

Advantageous further developments of the invention are set forth in the subsidiary claims.

Hereinafter the invention will be explained in detail with the aid of the drawings in which an example of embodiment is schematically illustrated.

Figure 2:
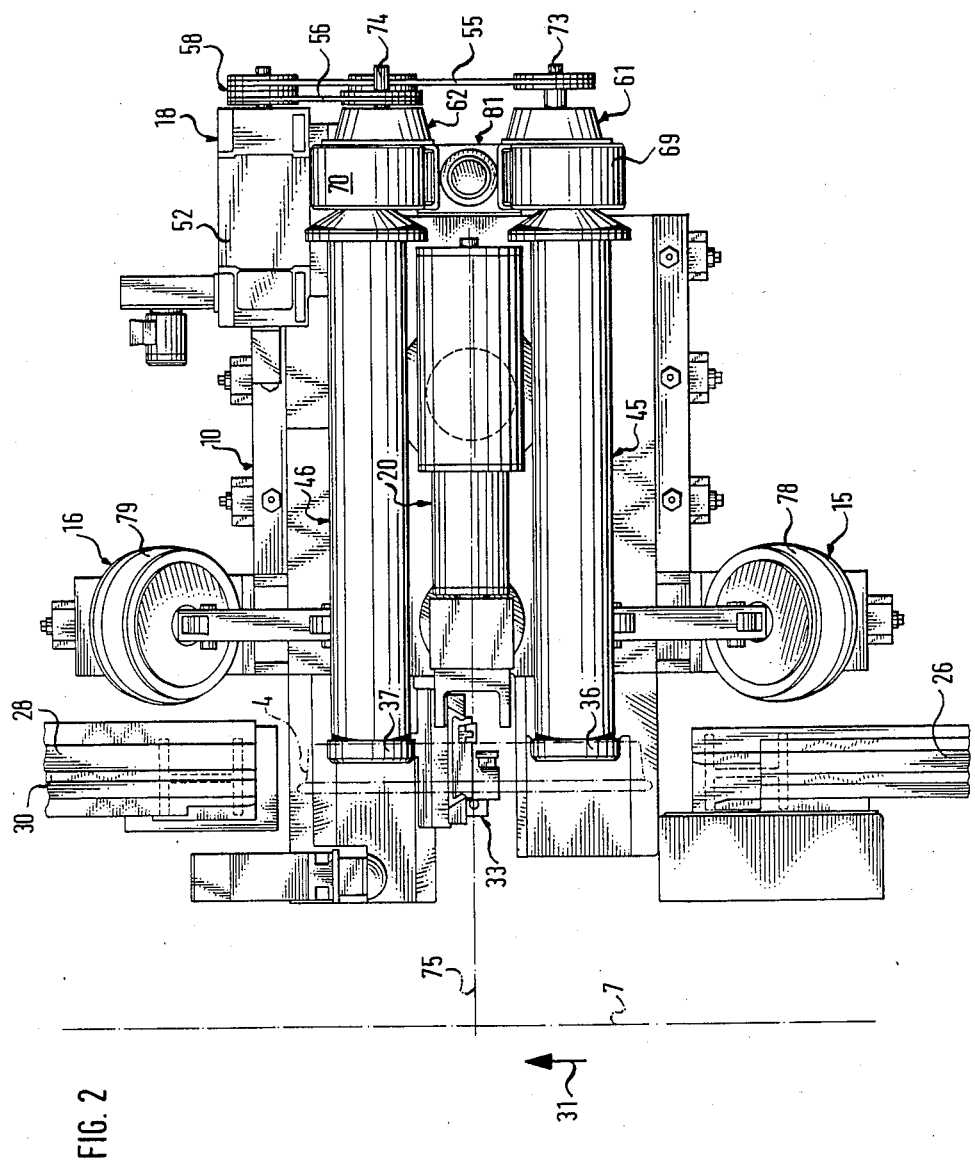
Figure 3:
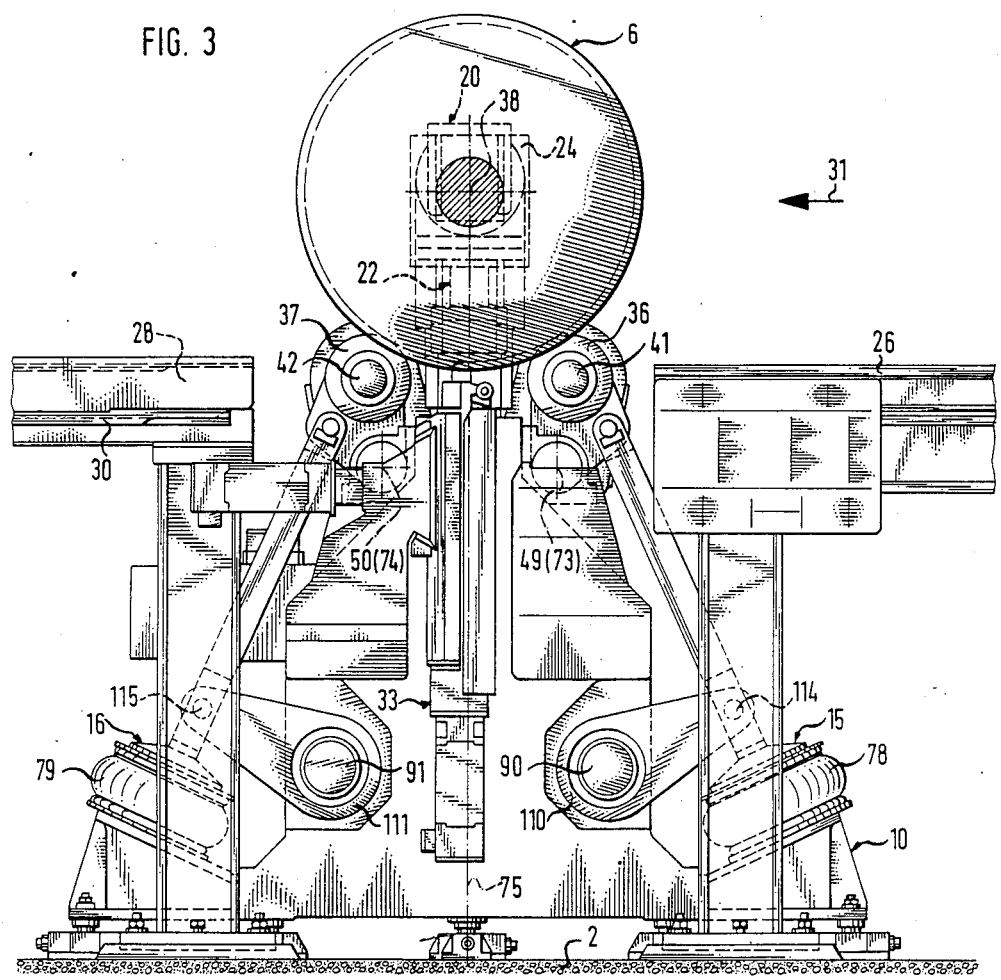
Figure 4:
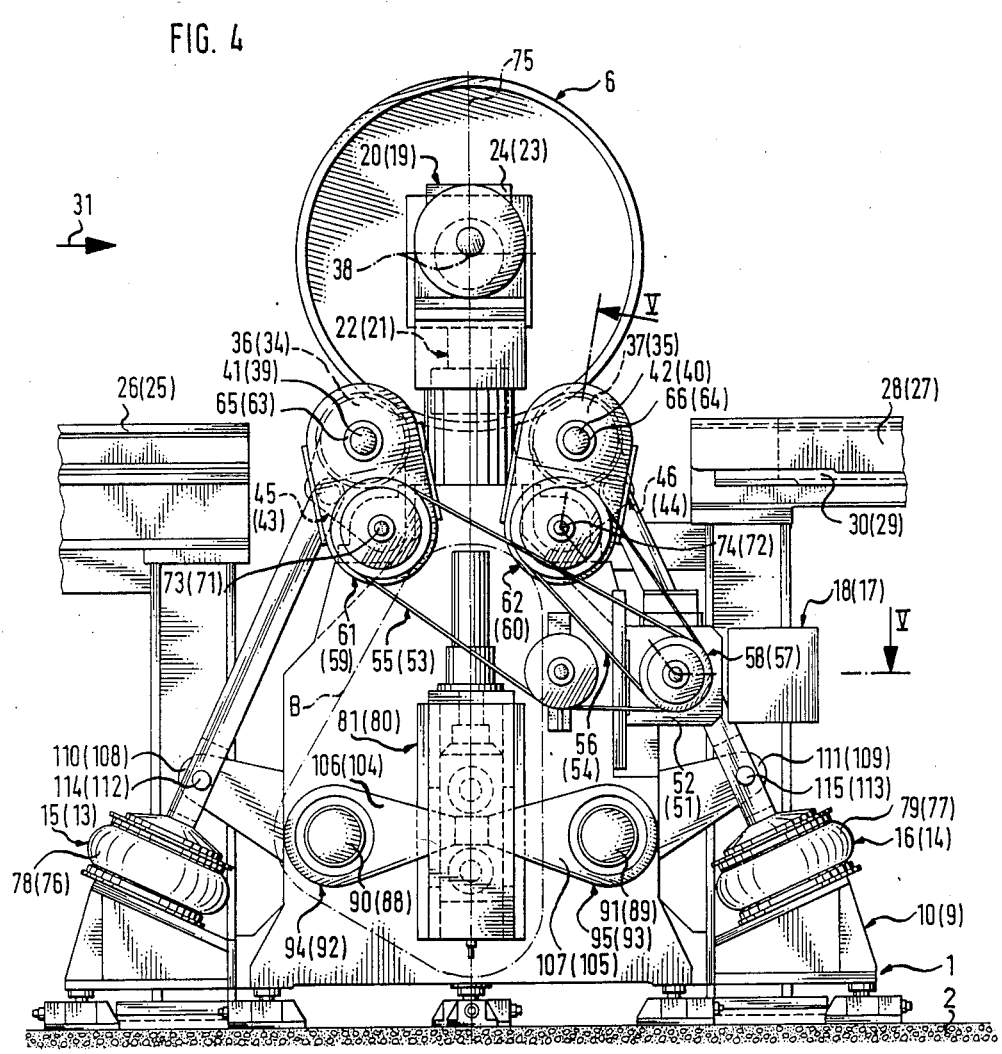
Figure 5:
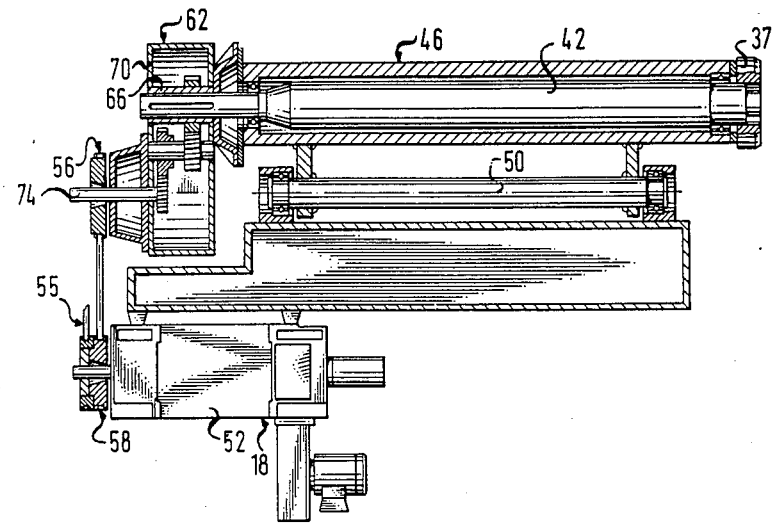
Figure 8:
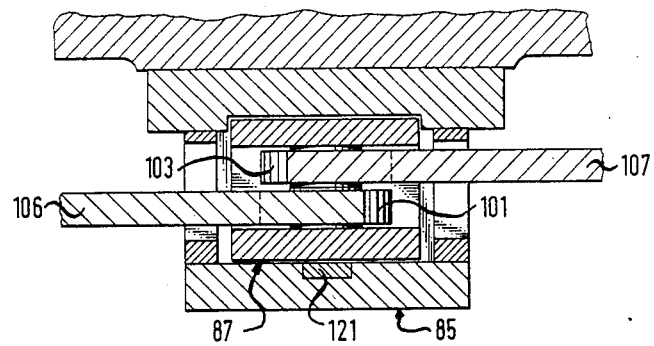
Figure 6:
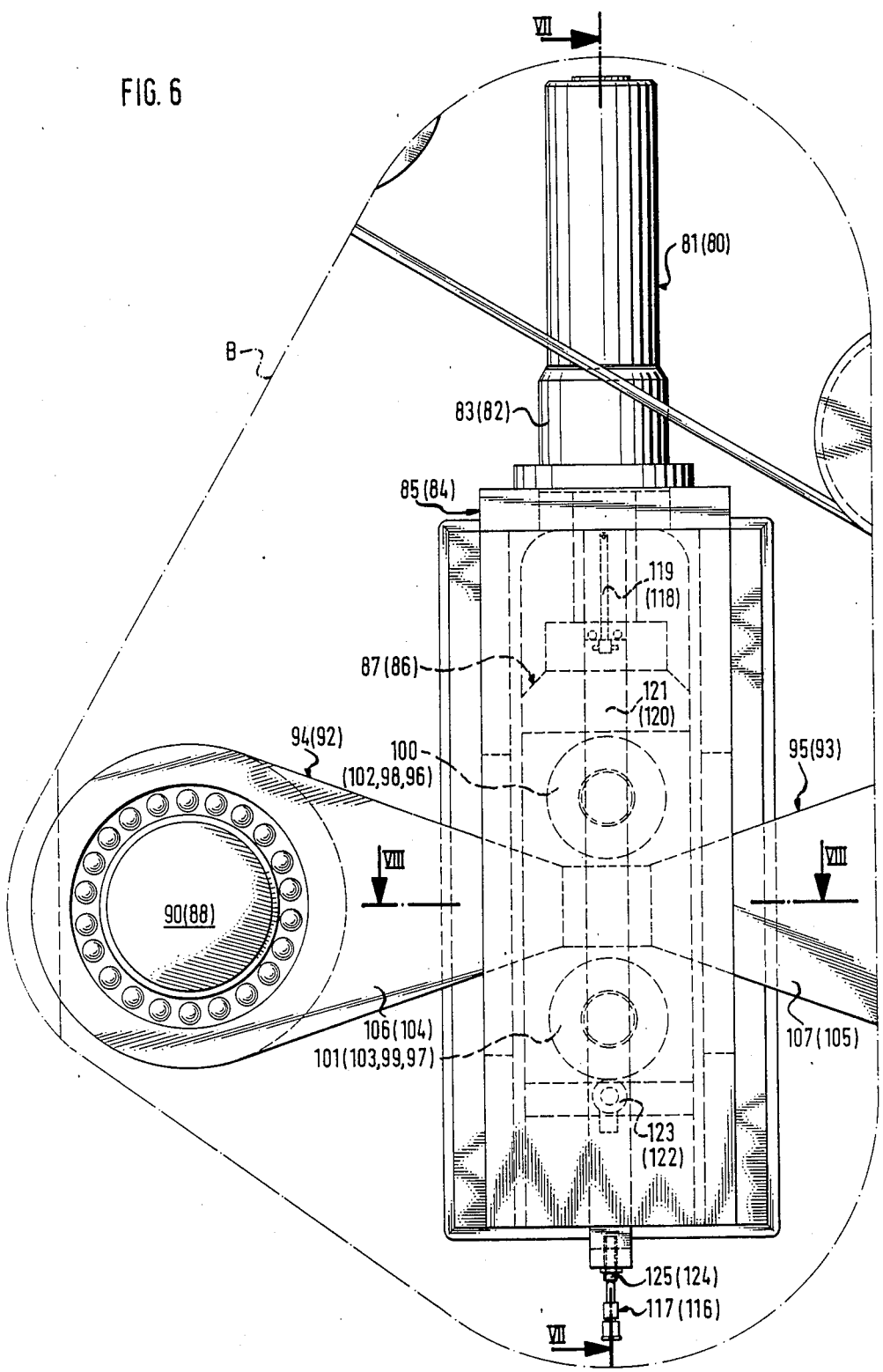
Figure 7:
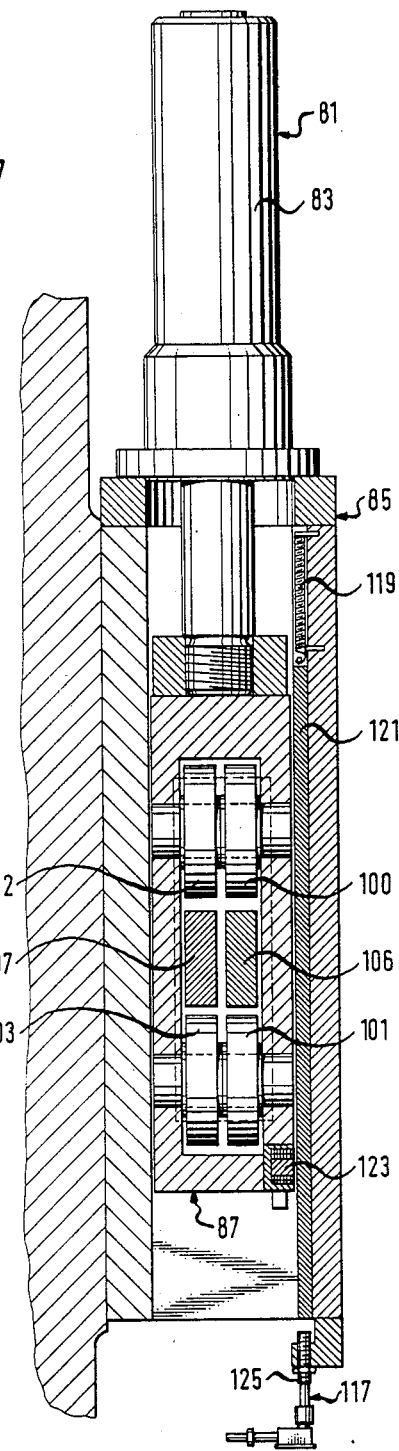

In the drawings:

FIG. 1 shows an underfloor wheelset turning machine and a wheelset received by it in elevation with a partial elevation of a vehicle body resting on the wheelset, with a section through two entry rails and two rail supports and a partial section through a foundation, FIG. 2 shows the right machine unit of the underfloor wheelset turning machine in plan view with dot-dash representation of the right wheel tire contour of the wheelset received to an enlarged scale, FIG. 3 is a section along the line III—III of FIG. 1 to an enlarged scale, FIG. 4 is a side elevation of the underfloor wheelset turning machine and of the wheelset received thereby in the direction of the arrow A of FIG. 1 with a partial section through the foundation to an enlarged scale, FIG. 5 is a section through the right machine unit of the underfloor wheelset turning machine corresponding to the line V—V in FIG. 4, FIG. 6 is a fragment B of FIG. 4 to an enlarged scale, FIG. 7 is a partial section corresponding to the line VII—VII of FIG. 6, FIG. 8 is a partial section corresponding to the line VIII—VIII of FIG. 6.

An underfloor wheelset turning machine 1 which is fixedly connected to a foundation 2 is used for reprofiling the wheel tire contours 3, 4 of a wheelset 6 installed in a rail vehicle 5.

The underfloor wheelset turning machine 1 has two machine units 9, 10 which are arranged symmetrically with respect to the centre 7 of a track 8 and each of which comprises a friction roller pair 11, 12 with two pivot drives 13, 14, 15, 16 and a rotary drive 17, 18, a holding-down means 19, 20 and a support means 21, 22 for an axle box 23, 24 of the wheelset 6.

The track 8 includes two entry rails 25, 26 and exit rails 27, 28 and two bridging rails 29, 30 for bridging the region between the entry rails 25, 26 and exit rails 27, 28.

The bridging rails 29, 30 are arranged displaceably in the track direction 31 so that they can be removed from the working region of the two swivel heads 32, 33.

The friction roller pairs 11, 12 each consist of two friction rollers 34, 35, 36, 37 each of which is mounted on a shaft 39, 40, 41, 42 disposed parallel to the wheelset axle.

Each shaft 39, 40, 41, 42 is double-mounted in a rocker 43, 44, 45, 46 with a pivot 47, 48, 49, 50 extending parallel to the wheelset axle 38.

The rockers 43, 44, 45, 46 are each articulately connected to a pivot drive 13, 14, 15, 16.

The friction rollers 34, 35, 36, 37 of each friction roller pair 11, 12 are connected to a rotary drive 17, 18 which comprises a motor 51, 52, a distributor gear 57, 58 consisting of two belt drives 53, 54, 55, 56 and two spur gears 59, 60, 61, 62.

All the spur gears 59, 60, 61, 62 are made completely identically.

Each spur gear 59, 60, 61, 62 is a plug-on gear whose hollow driven shaft 63, 64, 65, 66 is fitted to a shaft 39, 40, 41, 42.

The housing 67, 68, 69, 70 of each spur gear 59, 60, 61, 62 is connected by screws (not shown) fixedly to a rocker 43, 44, 45, 46.

The input shaft 71, 72, 73, 74 of each spur gear 59, 60, 61, 62 is arranged coaxially with a pivot axis 47, 48, 49, 50 so that during the pivot movement of the friction rollers 34, 35, 36, 37 the axial spacings of the belt drives 53, 54, 55, 56 remain unchanged (FIG. 5).

The pivot axes 47, 48, 49, 50 are disposed symmetrically to the machine centre 75.

Each pivot drive 13, 14, 15, 16 has a pneumatic bellows cylinder 76, 77, 78, 79 for producing the pivot motion.

Two pivot drives 13, 14, 15, 16 associated with each friction roller pair 11, 12 are coupled to a synchronizing means 80, 81.

Each synchronizing means 80, 81 is made up of a displacement unit 82, 83 and a lever mechanism 84, 85.

A lever mechanism 84, 85 includes a slide 86, 87 driven by a displacement unit 82, 83 and two one-arm lever pairs 92, 93, 94, 95 each secured to a pivot shaft 88, 89, 90, 91.

Each slide 86, 87 of the two lever mechanisms 84, 85 is formed with four pressure rollers 96, 97, 98, 99, 100, 101, 102, 103, two of which are associated with each lever 104, 105, 106, 107 of a lever pair 92, 93, 94, 95.

The other lever 108, 109, 110, 111 of each lever pair 92, 93, 94, 95 is connected in each case via a pin 112, 113, 114, 115 articulately to a pivot drive 13, 14, 15, 16.

Each lever mechanism 84, 85 includes a switch-off means 116, 117 comprising a switch bar 120, 121 suspended on a helical spring 118, 119, a shift bar coupling 122, 123 secured to a slide 86, 87 and a contact switch 124, 125.

On introduction of the wheelset 6 into the underfloor wheelset turning machine 1 it is first rolled over the entry rails 25, 26 and the bridging rails 29, 30 in the track direction 31 over the friction rollers 34, 35, 36, 37. Thereafter, the friction rollers 34, 35, 36, 37 are applied by pneumatic actuation of the pneumatic bellow cylinders 76, 77, 78, 79 uniformly against the wheel tire contours 3, 4.

Subsequently, the displacement units 82, 83 are actuated and via the lever mechanisms 84, 85 effect an alignment of the wheelset axle 38 with the machine centre 75 and a raising of the wheelset 6 into the position illustrated in FIGS. 1, 2 and 4.

The switching-off of the displacement units 82, 83 is by the switch-off means 116, 117, the switch bars 120, 121 of which during the raising of the wheelset 6 are moved with the slide 86, 87 downwardly to the contact switches 124, 125.

In the raised position of the wheelset 6 in succession the bridging rails 29, 30 are moved in the track direction 31 out of the working region of the swivel heads 32, 33, the two axle boxes 23, 24 of the wheelset 6 arrested by the hold-down means 19, 20 and the support means 21, 22, the displacement units 82, 83 relieved and the shift bar couplings 122, 123 disengaged (FIGS. 1, 3, 4, 6 and 7).

In the position of the wheelset 6 illustrated in FIGS. 1, 3 and 4 the reprofiling of the wheel tire contours 3, 4 is effected by the swivel heads or rotary supports 32, 33. The rotary drives 17, 18 impart a rotary motion to the friction rollers 34, 35, 36, 37 and the wheelset 6.

After the reprofiling of the wheel tire contours 3, 4 in succession the swivel heads 32, 33 are withdrawn from the working region, the bridging rails 29, 30 moved into the region between the entry rails 25, 26 and the exit rails 27, 28 and the wheelset 6 lowered by pivoting the friction rollers 34, 35, 36, 37 onto the bridging rails 29, 30.

Thereafter the wheelset 6 is rolled over the bridging rails 29, 30 and the exit rails 27, 28 out of the underfloor wheelset turning machine 1. Hereafter the underfloor wheelset turning machine 1 is available for reprofiling the wheel tire contours of another wheelset.

We claim:

1. A subfloor wheel-set lathe for the reprofiling of wheel-rim circumferences of railroad wheel-sets, comprising at least one rotation support, at least one lathe tool movable along a machining axis, two driven pairs of friction rolls each of which can be pressed against a wheel-rim circumference of a wheel-set; a swivel drive for each pair of friction rolls, the friction rolls of each pair of friction rolls being individually connected to the swivel drive, and each friction roll being pivotable about an axis disposed parallel to the rotation axis, a fluid operable cylinder included in each swivel drive to produce swivel motion, a synchronization device for each pair of swivel drives operable to synchronize swivelling of the friction rolls during raising of a wheel-set whereby to align the wheel-set axis with the rotation and machining axis, and said synchronizing device being free and operable thereafter to permit individual pivoting of the friction rolls.

2. A subfloor wheel-set lathe according to claim 1 characterized in that each synchronizing device consists of a displacement unit and a lever drive.

3. A subfloor wheel-set lathe according to claim 1 characterized in that lever drive has an associated switch-off device.

* * * * *